US012782222B2

(12) United States Patent
Girard

(10) Patent No.: US 12,782,222 B2
(45) Date of Patent: Nov. 3, 2026

(54) NON-INTRUSIVE MOUNTING OF AIRCRAFT FUEL PRESSURE SENSORS

(71) Applicant: Simmonds Precision Products, Inc., Vergennes, VT (US)

(72) Inventor: Joshua Girard, Vergennes, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 292 days.

(21) Appl. No.: 18/444,553

(22) Filed: Feb. 16, 2024

(65) Prior Publication Data

US 2025/0264368 A1 Aug. 21, 2025

(51) Int. Cl.
*G01L 19/14* (2006.01)
*B64D 37/00* (2006.01)
(Continued)

(52) U.S. Cl.
CPC ............ *G01L 19/142* (2013.01); *B64D 37/04* (2013.01); *B64D 45/00* (2013.01); *G01L 11/025* (2013.01); *G01L 19/0046* (2013.01)

(58) Field of Classification Search
CPC . G01L 19/0046; G01L 11/025; G01L 19/142; B64D 45/00; B64D 37/04; B64D 37/005; B64D 37/02; B64D 37/06; B64D 37/20; B64D 37/32; B64D 37/00; B64D 37/10; G01F 23/14; G01F 23/292; G01F 23/296; G01F 23/2962; G01F 23/38; B64C 3/34; B64C 3/185; B64C 39/10; B64C 1/064; B64C 1/06; B64C 1/00; B64C 3/26; B64C 25/20; B64C 7/00; B64C 39/04; B65D 65/38; H01R 13/73; H01R 24/52; G01C 5/00; B60L 3/0069; G01J 5/0821; F16L 39/04; F16L 5/10; B01D 69/10; B29C 70/32; B29D 24/004; B29D 99/0025;
(Continued)

(56) References Cited

U.S. PATENT DOCUMENTS 5,172,594 A 12/1992 Dyke
5,315,563 A 5/1994 Lichtenfels, II et al.
(Continued)

FOREIGN PATENT DOCUMENTS

EP 3054272 A2 8/2016
KR 10-2012-0027571 A 3/2012
WO 2023154827 A1 8/2023

OTHER PUBLICATIONS

Extended European Search Report for European Patent application No. 25158058.5, dated Jun. 24, 2025, 10 pages.

*Primary Examiner* — Brandi N Hopkins
(74) *Attorney, Agent, or Firm* — Tucker Ellis LLP

(57) ABSTRACT

A system includes an aircraft fuel tank defining an interior configured to store fuel for flight. The interior is defined by a plurality of tank walls including a vertical wing spar of a wing. An opening is defined through the vertical wing spar. A guide tube has a first end sealingly engaged in the opening of the vertical wing spar to prevent leakage between the guide tube and the opening. An optic fiber extends through the guide tube, sealingly engaged to the first end of the guide tube to prevent leakage between the optic fiber and the first end of the guide tube. An optical pressure sensor is optically coupled to the optic fiber proximate a second end of the guide tube opposite the first end.

19 Claims, 3 Drawing Sheets

(51) Int. Cl.

| | |
|---|---|
| ***B64D 37/04*** | (2006.01) |
| ***B64D 45/00*** | (2006.01) |
| ***G01F 23/14*** | (2006.01) |
| ***G01L 11/02*** | (2006.01) |
| ***G01L 19/00*** | (2006.01) |

(58) Field of Classification Search

CPC .. A62C 3/07; G01K 11/3206; G01N 29/2418; G01D 11/245

See application file for complete search history.

(56) References Cited

U.S. PATENT DOCUMENTS

| | | | |
|---|---|---|---|
| 5,357,801 A | 10/1994 | Sinclair | |
| 9,298,193 B2 | 3/2016 | Susko | |
| 2018/0052029 A1* | 2/2018 | Carralero | B64D 37/02 |
| 2018/0164140 A1 | 6/2018 | Carralero et al. | |

* cited by examiner

NON-INTRUSIVE MOUNTING OF AIRCRAFT FUEL PRESSURE SENSORS

BACKGROUND

1. Field

The present disclosure relates to pressure measurements, and more particularly to pressure and related measurements for fuel level determination in aircraft fuel tanks and the like.

2. Description of Related Art

Fuel quantity measurement techniques for aircraft fuel tanks are developing, and many of these utilize multiple pressure sensors throughout a fuel tank. Older fuel level probes have been relatively intrusive to maintain. If they ever need to be replaced or repaired, a technician must access the inside of fuel tank manually and/or with tools.

The conventional techniques have been considered satisfactory for their intended purpose. However, there is an ever present need for improved, less intrusive systems and methods for installing and maintaining fuel level sensors in aircraft fuel tanks and the like. This disclosure provides a solution for this need.

SUMMARY

A system includes an aircraft fuel tank defining an interior configured to store fuel for flight. The interior is defined by a plurality of tank walls including a vertical wing spar of a wing. An opening is defined through the vertical wing spar. A guide tube has a first end sealingly engaged in the opening of the vertical wing spar to prevent leakage between the guide tube and the opening. An optic fiber extends through the guide tube, sealingly engaged to the first end of the guide tube to prevent leakage between the optic fiber and the first end of the guide tube. An optical pressure sensor is optically coupled to the optic fiber proximate a second end of the guide tube opposite the first end.

At least one additional guide tube and optic fiber can extend from the vertical wing spar into the interior. The second end of the guide tube can terminate at terminal surface that defines an opening locally perpendicular to a longitudinal axis of the guide tube. The terminal surface can be devoid of any covering over the second end of the guide tube. The guide tube and optic fiber can be devoid of electrical circuitry within the interior. The guide tube can be a non-pressure transmitting tube. At least one drain hole can be defined laterally through the guide tube.

A retainer can be mounted inside the interior, wherein the second end of the guide tube engages the retainer. The retainer can include a pin or shoulder. At least one bracket or hose clamp can anchor the guide tube to the tank at a point along the guide tube between the first end and the second end. A sheath around the optic fiber can be configured to facilitate guiding the optic fiber along an inside surface of the guide tube. The first end of the guide tube can be mounted to the vertical spar proximate an access hatch or control surface of the wing. The guide tube can be polymeric. The pressure sensor can include a reflective pressure diaphragm extending in a direction parallel to a terminal surface of the guide tube.

A method includes during construction of an aircraft wing, installing a polymeric guide tube extending from a vertical wing spar at a first end of the guide tube into an interior of a fuel tank at a second end of the guide tube, engaging and the second end of the polymeric guide tube with a retainer in the interior of the fuel tank, affixing the guide tube along its length with one or more brackets or hose clamps, and mounting the first end of the guide tube to the vertical spar. The method can include advancing a sheathed optic fiber through an interior of the guide tube until a sealing fitting of the sheathed optic fiber engages a terminal at the first end of the guide tube, to position an optical probe at a tip of the optic fiber into a predetermined pressure-measurement position relative to the second end of the guide tube.

A method includes, e.g. after aircraft construction but during maintenance or the like, advancing a sheathed optic fiber through an interior of a guide tube in an aircraft fuel tank until a sealing fitting of the sheathed optic fiber engages a terminal at the first end of the guide tube, to position an optical probe at a tip of the optic fiber into a predetermined pressure-measurement position relative to a second end of the guide tube.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
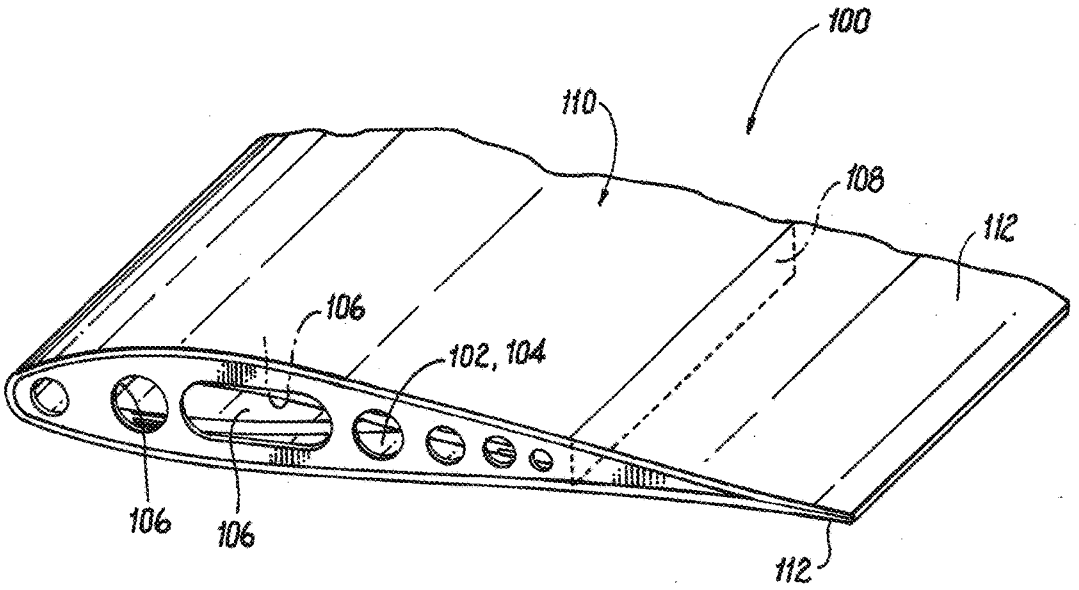
FIG. 1 is a schematic perspective view of an embodiment of a system constructed in accordance with the present disclosure, showing a portion of an aircraft wing with a fuel tank level sensor array therein.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to provide for facilitated installation, removal, and maintenance of fuel pressure sensors and the like without having to access the interior of an aircraft fuel tank manually or with tools.

Figure 2:
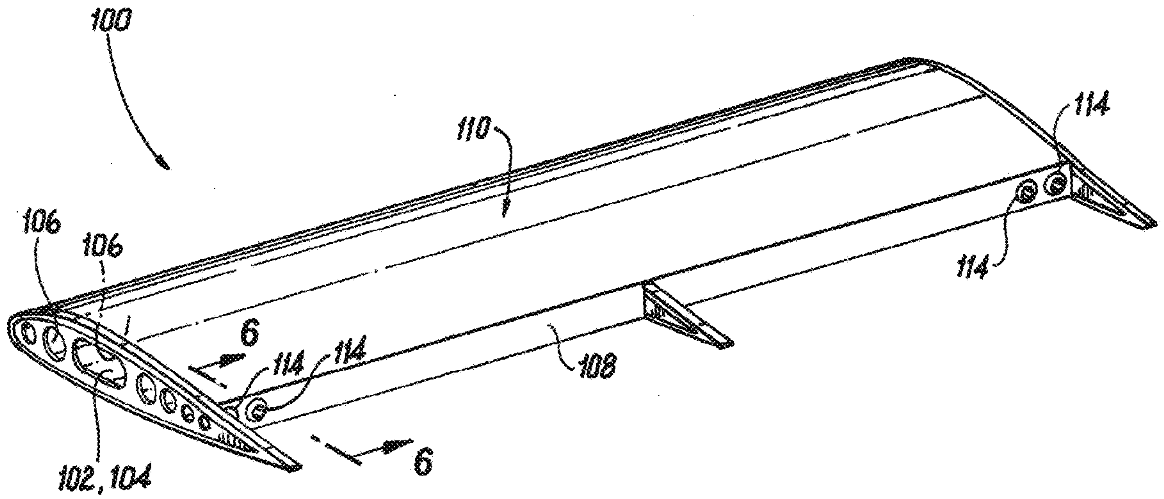
FIG. 2 is a schematic perspective view of a portion of the system of FIG. 1, showing the wing with control surfaces removed, and showing attachment points for guide tubes and optic fiber sensors.

The system 100 includes an aircraft fuel tank 102 defining an interior 104 configured to store fuel for flight. The interior 104 is defined by a plurality of tank walls 106 including a vertical wing spar 108 of an aircraft wing 110. FIG. 2 shows the wing 110 with the control surfaces 112 of FIG. 1 removed to show openings 114 that are defined through the vertical wing spar 108. A guide tube 116, two of which are labeled in FIG. 3, has a first end 118 sealingly engaged, e.g. with a sealing fitting 120 labeled in FIG. 6, in the opening 114 of the vertical wing spar 108 to prevent leakage between the guide tube 116 and the opening 114. The first end 118 of the guide tube is mounted to the vertical spar 108 at the opening 114 proximate an access hatch or control surface 112 of the wing 110 for easy access for installation and removal of pressure sensors as further described below.

Figure 3:
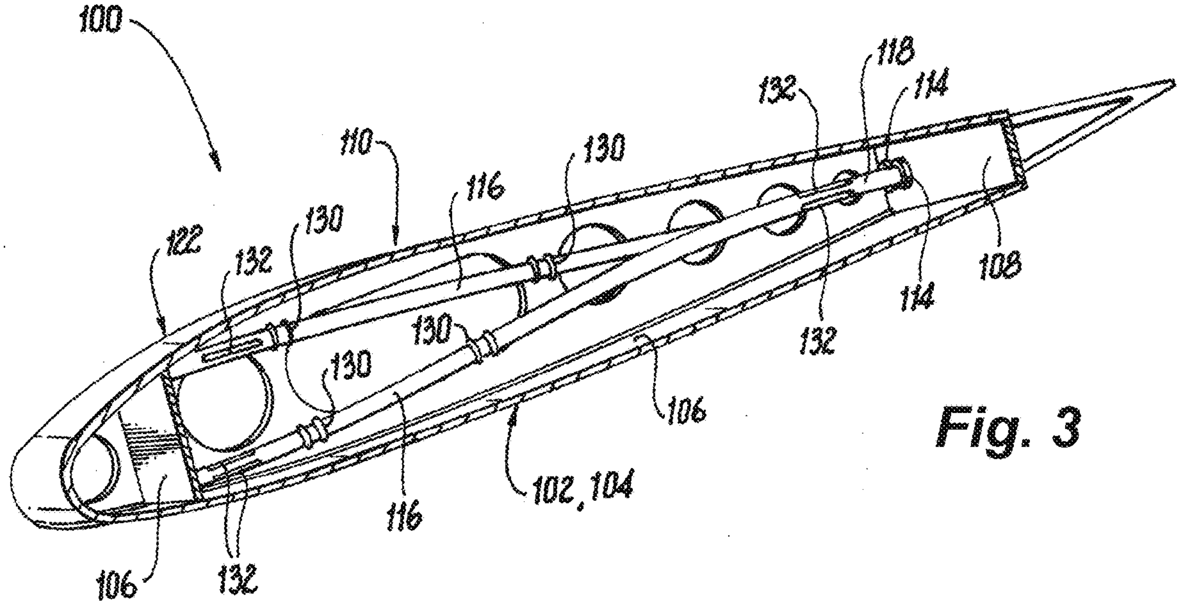
FIG. 3 is a schematic cross-sectional perspective view of the system of FIG. 1, showing brackets along the length of the guide tubes, mounting the guide tubes to the internal structure of the fuel tank.
Figure 4:
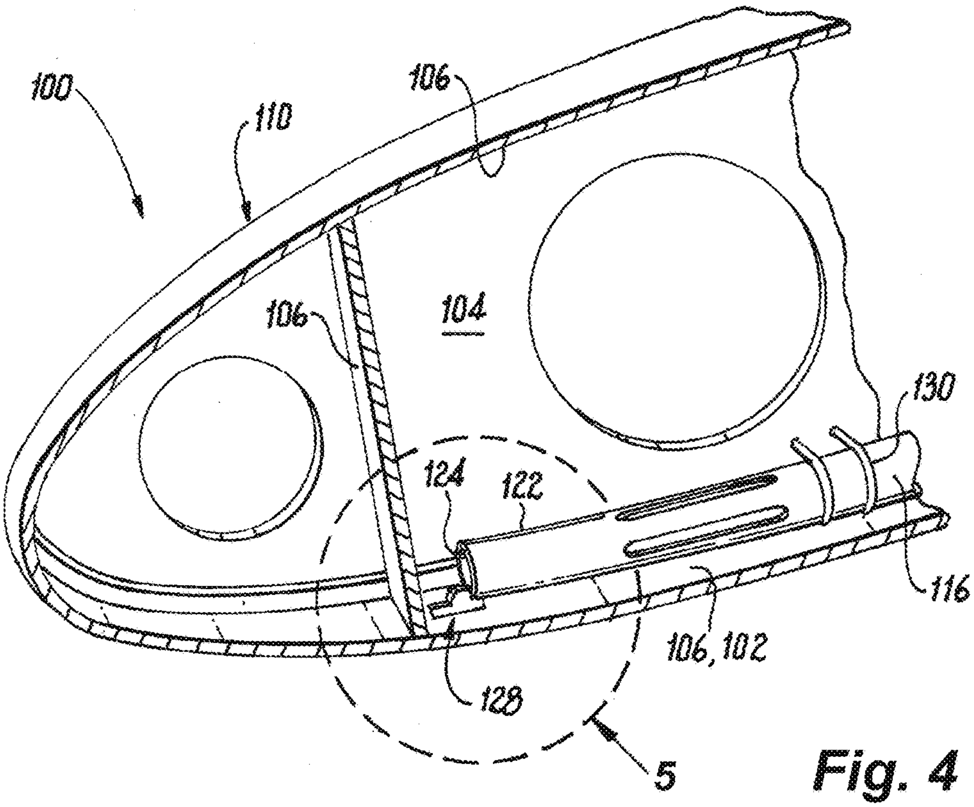
FIG. 4 is a schematic cross-sectional perspective view of the system of FIG. 1, showing one of the retainers for positioning the sensor end of the guide tube inside the fuel tank.

With reference now to FIG. 4, the second end 122 of the guide tube 116 terminates at terminal surface 124 that defines an opening 126 (labeled in FIG. 5) locally perpendicular to a longitudinal axis A (labeled in FIG. 5) of the guide tube 116. A retainer 128 is mounted inside the interior 104 to one of the tank walls 106, wherein the second end 122 of the guide tube engages the retainer 128. The retainer 128 includes a pin, shoulder, or the like, affixed in the interior 104 at a position where it is intended to take pressure measurements for the fuel tank 102. At least one bracket or hose clamp 130 anchors the guide tube 116 to the tank 102 at one or more points along the guide tube 116 between the first end 118 and the second end 130. Although FIG. 3 shows two guide tubes 116, any suitable number of additional guide tubes (and associated optic fibers) can be used as needed extending from the vertical wing spar 108 into predetermined positions in the interior 104 to provide pressure measurements at all the intended positions within the tank 102.

Figure 5:
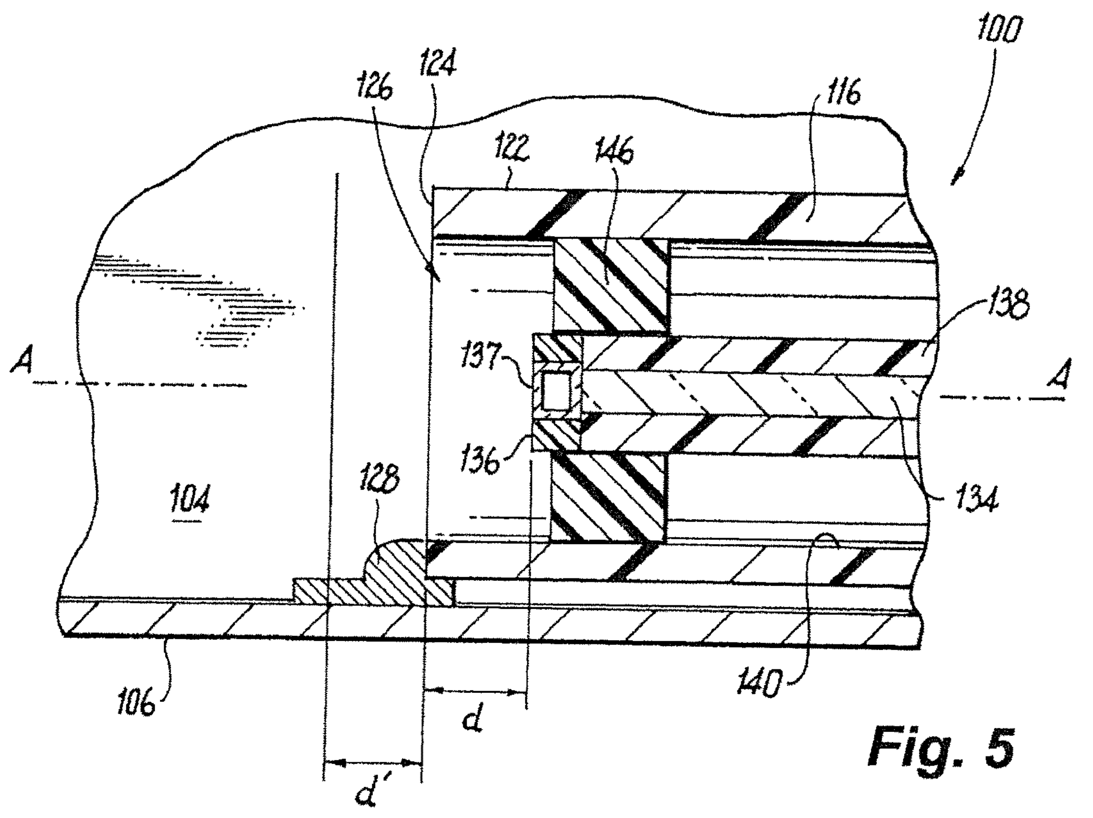
FIG. 5 is a schematic cross-sectional side elevation view of a portion of the system of FIG. 1, showing the predetermined position of the probe tip relative to the terminal surface of the guide tube at the second end of the guide tube.

Referring now to FIG. 5, the terminal surface 124 of the guide tube 116 defines the opening 126 which is devoid of any covering over the second end 122 of the guide tube 166. The guide tube 122 is a non-pressure transmitting tube. At least one drain hole 132 (labeled in FIGS. 3-4) is defined laterally through the guide tube 116 to allow the interior of the guide tube 116 to drain and prevent transmission of pressure along the guide tube 116.

With continued reference to FIG. 5, an optic fiber 134 (single fiber strand or bundle of fiber strands) extends through the guide tube 116. An optical pressure sensor 136, such as a Fabry-Pérot type, Bragg grating type, and/or the like type sensor, is mounted to and optically coupled to the optic fiber 134 proximate the second end 122 of the guide tube 116. A sheath 138 around the optic fiber 134 is configured to facilitate guiding the optic fiber 134 along the inside surface 140 of the guide tube 116 as further described below. In a Fabry-Pérot type sensor 136, the pressure sensor 136 includes a reflective pressure diaphragm 137 extending in a direction parallel to a terminal surface 124 of the guide tube 116. The optic fiber 134 is sealingly engaged to the first end 118 of the guide tube 116, e.g. with a sealing fitting 142 labeled in FIG. 6, to prevent leakage between the optic fiber/sheath 134, 128 and the first end 118 of the guide tube 116. The sealing provided by the fittings 120 and 142 prevents fuel inside the tank 102 from leaking out through the opening 114. The guide tube 118 can be made of a polymeric material, the optic fiber 134 and sensor 136 can be made of glass materials, and the sheath 138 can be made of a polymer or glass material, so the system 100 can be devoid of electrical circuitry within the interior 104 of the tank 102.

Figure 6:
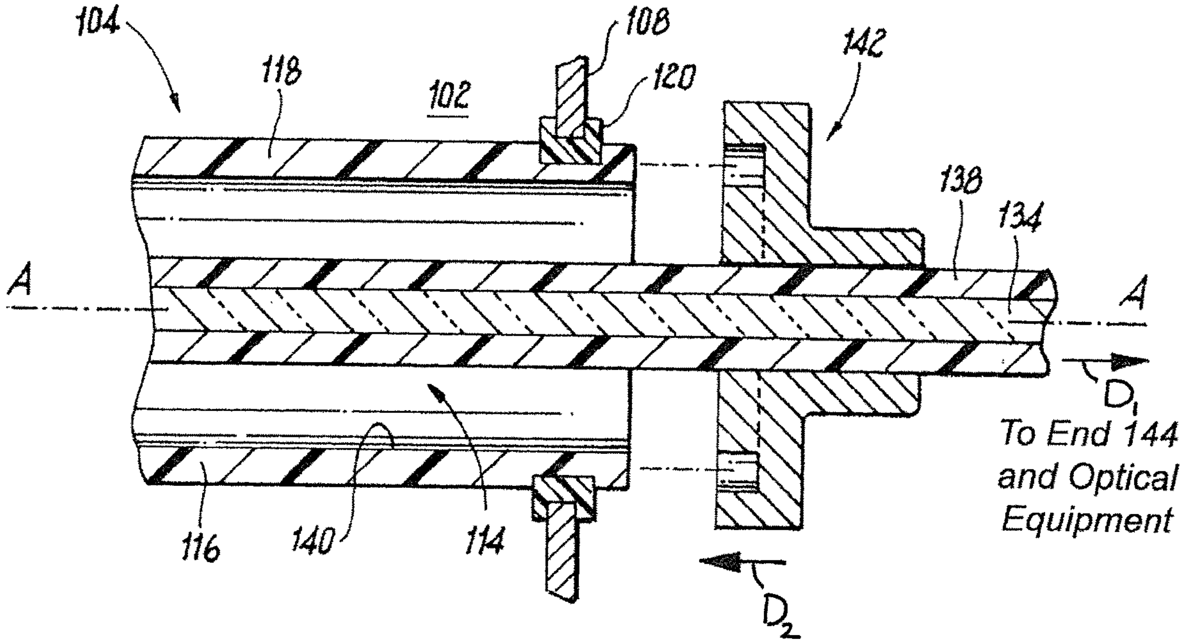
FIG. 6 is a schematic cross-sectional side elevation view of a portion of the system of FIG. 1, showing connecting of the optic fiber to the first end of the guide tube at the vertical spar.

With reference to FIG. 3, during construction of the aircraft wing 110, the guide tube 116 can be installed, extending from the vertical wing spar 108 at a first end 118 of the guide tube 116 into the interior 104 of the fuel tank 102 at the second end 122 of the guide tube 116 by inserting the second end 122 of the guide tube 116 through the opening 114 in the vertical wing spar 108 until the second end 122 of the polymeric guide tube 116 engages with the retainer 128 as shown in FIGS. 4 and 5. The position of the retainer 128 and the length of the guide tube 116 are both known so as to have the first end 118 of the guide tube 116 seal to the opening 114 with the second end 122 engaging the retainer 128, e.g. mounting the first end 118 of the guide tube 116 with the fitting 120 to the vertical spar 108 as shown in FIG. 6. The guide tube 116 can be affixed along its length to the structures in the interior 104 of the fuel tank 102 with one or more brackets or hose clamps 130 (as shown in FIGS. 3-4).

With reference now to FIG. 5, with the guide tube 116 mounted in place, the optical probe tip or sensor 136 can be placed in the intended position in the tank 102 by advancing a sheathed optic fiber 134 through the interior of the guide tube 116 until a sealing fitting 142 of the sheathed optic fiber 134 engages a terminal, e.g. fitting 120 of the guide tube 116, at the first end 118 of the guide tube 116 as indicated in FIG. 6 by the large arrows. This places the optical probe or sensor 136 at a tip of the optic fiber 134 into a predetermined pressure-measurement position relative to the second end 122 of the guide tube 118. The sensor 136 can be precisely placed in the intended position, whether that is slightly inside the guide tube 116 as indicated by the span d in FIG. 5, slightly outside the guide tube 116 as indicated by the span d' in FIG. 5, or exactly flush with the terminal surface 124 of the guide tube 124. The spacer 146 proximate the sensor end of the optic fiber 134 spaces the sensor 136 and inner wall of the guide tube 116 apart to help ensure proper positioning of the sensor within the guide tube 116. The end 144 of the optic fiber 134 not shown in FIG. 6 can be optically coupled to optical equipment such as an interferometer to make pressure measurements, as indicated in FIG. 6.

With reference to FIG. 6, after aircraft construction but during maintenance or the like, the optic fiber 134 and its sensor 126 can be removed by disengaging the fitting 142 from the opening 114 and pulling the optic fiber 134 out of the guide tube 134 in the manner $D_1$. A refurbished, repaired, or new optic fiber 134 and sensor 136 can be replaced into the proper sensing position by advancing the sheathed optic fiber 136, sensor end first, in the manner $D_2$ through an interior of the guide tube 116 (which would still be in place in an aircraft fuel tank 102) until a sealing fitting 142 of the sheathed optic fiber 134 engages a terminal, e.g. fitting 120, at the first end 118 of the guide tube 116. This positions the optical probe at a tip of the optic fiber 134 into the predetermined pressure-measurement position relative to a second end 122 of the guide tube, as shown in FIG. 5. There is no need to align the end of the optic fiber 134 with any keyways, splines, or the like in the second end 122 of the guide tube 116—the end of the optic fiber 134 is inherently positioned in the correct place by having matched lengths of the optic fiber 134 and the guide tube 122.

Systems and methods as disclosed herein provide potential benefits including the following. No internal access to the fuel tank is necessary after original manufacture with this approach, i.e. a technician's hands or tools need not ever enter the interior of the fuel tank. No other opening besides the opening 114 (labeled in FIG. 2) need be used to access the sensor 134 (labeled in FIG. 5). The sensors can be removed/replaced/maintained at any time with very minimal intrusion. Tubes, flanges and fittings can be made out of any suitable fuel-proof material, which is conducive to the trend to move away from having metallic materials in fuel level sensors inside the tank. Additionally, the guide tubes can have some drainage holes in them to allow for the free passage of fuel behind the sensor so it does not stagnate there, and so no fuel need be pulled out when a technician removes the sensor as described above. The openings 114 can be midway vertically on the vertical wing spar 108 (labeled in FIG. 2) to provide structural strength around the openings 114.

The methods and systems of the present disclosure, as described above and shown in the drawings, provide for facilitated installation, removal, and maintenance of fuel pressure sensors and the like without having to access the interior of an aircraft fuel tank manually or with tools. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:

an aircraft fuel tank defining an interior configured to store fuel for flight, wherein the interior is defined by a plurality of tank walls including a vertical wing spar of a wing;

an opening through the vertical wing spar;

a guide tube with a first end sealingly engaged in the opening of the vertical wing spar to prevent leakage between the guide tube and the opening;

an optic fiber extending through the guide tube, sealingly engaged to the first end of the guide tube to prevent leakage between the optic fiber and the first end of the guide tube; and an optical pressure sensor optically coupled to the optic fiber proximate a second end of the guide tube opposite the first end and spaced radially from the guide tube for allowing fuel to flow within the interior of the guide tube to both sides of the optical pressure sensor.

2. The system as recited in claim 1, further comprising at least one additional guide tube and optic fiber extending from the vertical wing spar into the interior.

3. The system as recited in claim 1, wherein the second end of the guide tube terminates at a terminal surface that defines an opening locally perpendicular to a longitudinal axis of the guide tube.

4. The system as recited in claim 3, wherein the terminal surface is devoid of any covering over the second end of the guide tube.

5. The system as recited in claim 1, wherein the guide tube and the optic fiber are devoid of electrical circuitry within the interior.

6. The system as recited in claim 1, wherein the guide tube is a non-pressure transmitting tube.

7. The system as recited in claim 6, wherein at least one drain hole is defined laterally through the guide tube.

8. The system as recited in claim 1, further comprising a retainer mounted inside the interior, wherein the second end of the guide tube engages the retainer.

9. The system as recited in claim 8, wherein the retainer includes a pin or shoulder.

10. The system as recited in claim 8, further comprising at least one bracket or hose clamp anchoring the guide tube to the tank at a point along the guide tube between the first end and the second end.

11. The system as recited in claim 1, further comprising a sheath around the optic fiber configured to facilitate guiding the optic fiber along an inside surface of the guide tube.

12. The system as recited in claim 1, wherein the first end of the guide tube is mounted to the vertical spar proximate an access hatch or control surface of the wing.

13. The system as recited in claim 1, wherein the guide tube is polymeric.

14. The system as recited in claim 1, wherein the pressure sensor includes a reflective pressure diaphragm extending in a direction parallel to a terminal surface of the guide tube.

15. A method comprising:

during construction of an aircraft wing, installing a polymeric guide tube extending from a vertical wing spar at a first end of the guide tube into an interior of a fuel tank at a second end of the guide tube, engaging the second end of the polymeric guide tube with a retainer in the interior of the fuel tank, affixing the guide tube along its length with one or more brackets or hose clamps, mounting the first end of the guide tube to the vertical spar, and advancing a sheathed optic fiber through an interior of the guide tube until a sealing fitting of the sheathed optic fiber engages a terminal at the first end of the guide tube, to position an optical probe at a tip of the optic fiber into a predetermined pressure-measurement position relative to the second end of the guide tube and to prevent fuel flow out of the first end of the guide tube.

16. A method comprising:

advancing a sheathed optic fiber through an interior of a guide tube in an aircraft fuel tank until a sealing fitting of the sheathed optic fiber engages a terminal at the first end of the guide tube, to position an optical probe at a tip of the optic fiber into a predetermined pressure-measurement position relative to a second end of the guide tube and to prevent fuel flow out of the first end of the guide tube.

17. The method as recited in claim 16, wherein a terminal surface of the guide tube is devoid of any covering over the second end of the guide tube.

18. The method as recited in claim 16, wherein the guide tube and optic fiber are devoid of electrical circuitry within the interior.

19. The method as recited in claim 16, wherein the guide tube is a non-pressure transmitting tube.

* * * * *